United States Patent [19]

Göhler et al.

[11] 4,247,227

[45] Jan. 27, 1981

[54] APPARATUS FOR THE CONVEYANCE OF DUST-LIKE OR DUST CONTAINING SOLIDS INTO A PRESSURIZED SYSTEM BY MEANS OF A PRESSURIZED LOCK CHAMBER

[75] Inventors: Peter Göhler; Horst Kretschmer; Han-Joachim Schweigel, all of Freiberg, German Democratic Rep.

[73] Assignee: Brennstoffinstitut Freiberg, Freiberg, German Democratic Rep.

[21] Appl. No.: 971,078

[22] Filed: Dec. 19, 1978

[30] Foreign Application Priority Data

Aug. 9, 1977 [DD] German Democratic Rep. .... 200492

[51] Int. Cl.[3] .............................................. B65G 53/66

[52] U.S. Cl. ........................................ 406/15; 55/283; 55/302; 406/146; 406/172

[58] Field of Search ....................... 406/10, 11, 14, 15, 406/16, 19, 25, 109, 146, 171, 172; 414/217; 55/283, 302, 303; 48/86 R

[56] References Cited

U.S. PATENT DOCUMENTS

| | | | |
|---|---|---|---|
| 3,069,205 | 12/1962 | McIver et al. | 406/172 X |
| 3,073,097 | 1/1963 | Hallett et al. | 55/302 X |
| 3,386,773 | 6/1968 | Ballard, Jr. | 406/16 |
| 3,620,575 | 11/1971 | McIver et al. | 406/16 |

FOREIGN PATENT DOCUMENTS

| | | | |
|---|---|---|---|
| 2002463 | 2/1979 | United Kingdom | 406/172 |

*Primary Examiner*—Jeffrey V. Nase

*Attorney, Agent, or Firm*—Michael J. Striker

[57] ABSTRACT

Dust-like or dust containing solids are passed into a pressurized system via a lock chamber apparatus wherein a porous filter is provided separating the lock chamber into an upper space and into a lower space. Normally a pressurized gas is passed into the lower space and it is discharged from the upper space during the pressure release phase after passing through the filter. When a predetermined differential pressure is exceeded between the upper and the lower space of the lock chamber because of a clogging up of the filter the filter is cleansed by passing the pressure gas partially or totally into the upper space of the lock chamber so that it passes through that filter in the direction reverse to that during the pressure release phase.

4 Claims, 1 Drawing Figure

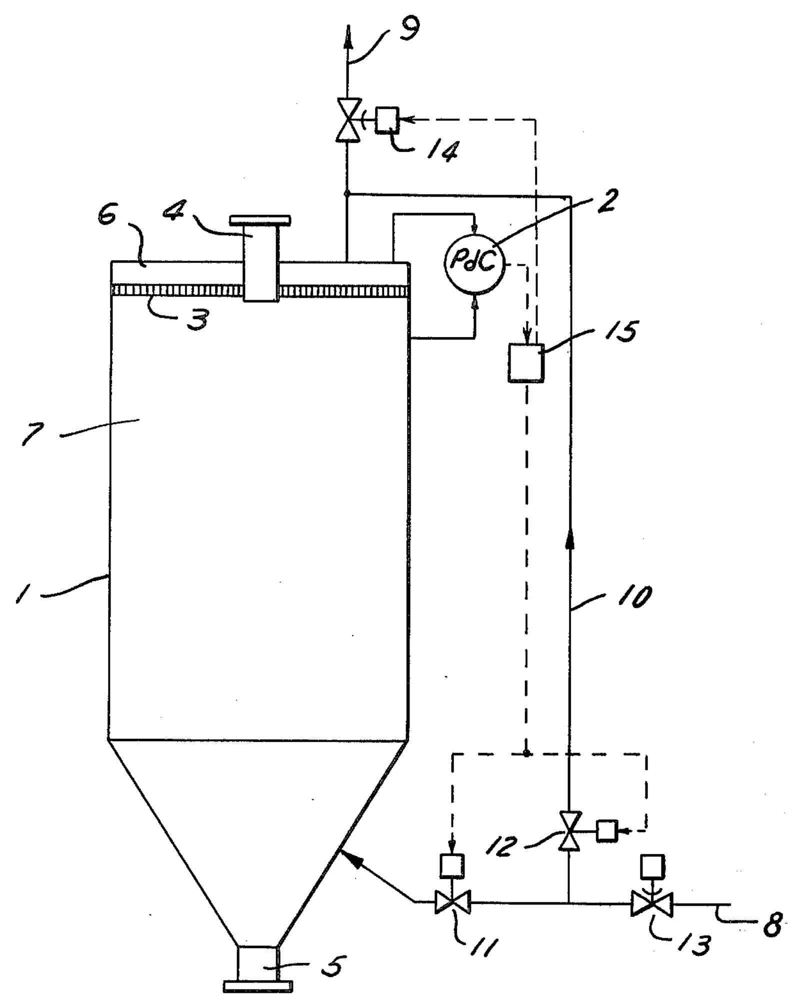
9
14
2
6
4
PdC
3
15
7
1
10
12
11
13
8
5

APPARATUS FOR THE CONVEYANCE OF DUST-LIKE OR DUST CONTAINING SOLIDS INTO A PRESSURIZED SYSTEM BY MEANS OF A PRESSURIZED LOCK CHAMBER

BACKGROUND OF THE INVENTION

The invention relates to a lock chamber apparatus for conveying a dust-like or dust containing material into a pressurized system such as it is used during gasification of coal at elevated pressures.

The conveyance of solid materials into a system of higher pressure is frequently effected by means of lock chambers. The lock chambers are filled at atmospheric pressure with the solid material and are then filled with a pressurized gaseous medium to reach a pressure level equal to that of the subsequent pressure system such as a coal gasifier. After completion of that phase the lock chamber pressure is released. Since, however, it is unavoidable that residual dust remains in the lock chamber the pressure-released gas is being contaminated and therefore a separate dust cleaning of the released gas is necessary in order to avoid pollution of the atmosphere by dust emissions and to avoid also technological disturbances.

It is therefore an object of the invention to provide for an apparatus which dispenses with the separate dust removal device and to provide for otherwise carried out dust removal from the released pressure gas. Thus, the cost of the apparatus is reduced and the danger of technological malfunction is lowered and the loss in material is also decreased.

SUMMARY OF THE INVENTION

This is accomplished by an apparatus comprising
- a lock chamber;
- a filter partitioning said chamber into an upper and a lower space;
- an inlet and outlet from said lower space for said solid material;
- an inlet duct for introducing a pressurized gas into said lower space to raise the atmospheric pressure in said lock chamber to the pressure in the pressure system into which the material is passed;
- a flow control valve and a shut-off valve disposed in spaced relationship in said inlet duct for said pressure gas;
- a discharge duct in said upper space for the pressure gas when the pressure of the same is released after passing the gas through said filter where it is freed of entrained dust;
- a branch duct passing from a place intermediate said flow control valve and said shut-off valve and leading into said upper space;
- a shut-off valve, each, in said branch duct and in said discharge duct; and
- gauge means for measuring the differential between the pressure in said lower space and the pressure in said upper space,
- whereby upon a predetermined pressure differential indicated by said gauge means and due to the clogging up of said filter, pressurized gas may be blocked from entering said lower space and upon closing of said shut-off valve in the discharge duct and opening of the shut-off valve in the branch duct may be passed through said branch duct into the upper space of the lock chamber and through said filter into the lower space resulting in a backwash action on said filter. During the release of pressure in the lock chamber and while the pressure is lowered in the lock chamber to the pressure of the environment the mean pressure is still considerably above atmospheric pressure during the operation. Therefore, considerably smaller filter surfaces are necessary because of the lowered volume flow. Nevertheless, a substantial part of the dust eliminated by the filter falls back into the lower space of the lock chamber and a clogging up of the filter by fine dust could normally be completely prevented. This is however accomplished by the above invention where the pressure gas serves to clean the filter during the pressure cycle from any dust residues.

In an embodiment of the invention the differential pressure meter may be combined with a control device which automatically opens the shut-off valve in the branch duct when a predetermined pressure difference is exceeded and at the same time may either open or close the shut-off valve in the inlet duct and may either open or close the discharge duct valve. The valves may thereafter be operated independently from the further development of the pressure difference through a predetermined time phase which should at least be equal to the time of a complete cycle.

The advantage of the device of the invention is that no special implements or apparatus parts are necessary to remove entrained dust from the gas and the environment into which the pressure release gas is discharged is thus protected and the dust actually remains within the pressure system for further use.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE of the drawing shows in diagrammatic form a lock chamber apparatus according to the invention.

DESCRIPTION OF THE PREFERRED EMBODIMENTS

With reference to the drawing it will be understood that the dust-like or dust containing solid material is introduced into the lock chamber through the inlet 4 and after being pressurized therein is discharged through the outlet 5. The pressure gas is obtained from a duct 8 and passes through a flow control valve 13 and a shut-off valve 11 before passing into the lock chamber. A porous filter 3 is provided in the lock chamber which partitions the chamber into an upper space 6 and a lower space 7. As will be seen from the drawing the introduced solid material passes directly into the lower space. Likewise the pressure gas is introduced into the lower space preferably at the bottom portion thereof.

In the upper space there is provided a gas release duct 9 which is controlled by a pressure release valve 14. During the pressure release cycle this valve 14 is opened while the valve 11 is closed. The pressure gas thus is released through the duct 9 to the atmosphere. During this step as appears from the drawing, the released gas must pass in upward direction through the filter 3.

If the filter becomes clogged up there will be a pressure difference between the upper space 6 and the lower space 7.

A branch duct 10 is provided as appears from the drawing between the flow control valve 13 and the shut-off valve 11. This branch duct leads into the duct 9 used in the pressure release cycle but merges into the duct below the pressure release valve 14. During the pressurizing of the lock chamber the pressure release valve 14 is closed while it is opened during the pressure release step.

Gauge means 2 are provided to indicate the pressure differential between the upper space and the lower space of the lock chamber. If a certain predetermined limit value is exceeded a control device 15 is actuated which closes the shut-off valve in the inlet duct for the pressure gas and also closes the disharge valve 14. and opens the shut-off valve 12 in the branch duct 10. The pressure gas then passes through the duct 10 into the lock chamber via the discharge duct 9 since during this pressurizing step the pressure release valve 14 is closed. Alternatively the shut-off valves 12 and 11 may also both remain open during the cleaning step. In that case only part of the pressure gas would pass through the duct 10, while another part would still pass in the normal way directly into the lower space of the lock chamber. Thus, all or part of the pressure gas may be passed into the upper space and effect the cleaning of the filter.

Since the pressure differential is subject to variations during the pressure release step it is preferred that the valves 11, 12 and 14 are locked in their position by means of the control device 15 for a predetermined time period. This time period should at least correspond to the time of a complete lock chamber cycle in order to assure a sufficient cleaning of the filter.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An apparatus for the conveyance of dust-like or dust containing solid material into a pressurized system, the said apparatus comprising a lock chamber; a filter partitioning said chamber into an upper and a lower space; an inlet and outlet from said lower space for said solid material; an inlet duct for introducing a pressurized gas into said lower space to raise the atmospheric pressure in said lock chamber to the pressure in said pressure system; a flow control valve and a shut-off valve disposed in spaced relationship in said inlet duct for said pressure gas; a discharge duct in said upper space for the pressure gas during pressure release and after passing the gas through said filter where it is freed of entrained dust; a branch duct passing from a place intermediate said flow control valve and said shut-off valve and leading into said discharge duct between said upper space and a pressure release valve in said discharge duct; a shut-off valve in said branch duct; and gauge means for measuring the differential between the pressure in said lower space and the pressure in said upper space.

2. The apparatus of claim 1, wherein control means are provided which are automatically responsive to the pressure measurement by said gauge means for totally or partially opening and closing said shut-off valves and said pressure release valve in said inlet duct, branch duct and discharge duct.

3. The apparatus of claim 2, wherein said control means are operative to retain the shut-off valve in said branch duct in open position for a predetermined time interval and irrespective of further changes in the pressure differential once the valve has been opened.

4. The apparatus of claim 3, wherein said control means are operative to keep the shut-off valves both in the branch duct and in the inlet duct for the pressure gas open simultaneously to pass the pressure gas partly through the branch duct and partly through the inlet duct.

* * * * *